(12) United States Patent
Parasuram et al.

(10) Patent No.: US 12,252,157 B2
(45) Date of Patent: *Mar. 18, 2025

(54) RESPONDING TO EMERGENCY VEHICLES FOR AUTONOMOUS VEHICLES

(71) Applicant: Waymo LLC, Mountain View, CA (US)

(72) Inventors: Aishwarya Parasuram, Sunnyvale, CA (US); Xin Liu, Mountain View, CA (US); Luyuan Lin, Mountain View, CA (US); Brandon Douglas Luders, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,277

(22) Filed: Oct. 30, 2023

(65) Prior Publication Data

US 2024/0124030 A1    Apr. 18, 2024

Related U.S. Application Data

(63) Continuation of application No. 17/359,861, filed on Jun. 28, 2021, now Pat. No. 11,834,076.

(51) Int. Cl.
*B60W 60/00* (2020.01)
*G05D 1/00* (2024.01)

(52) U.S. Cl.
CPC ....... *B60W 60/0027* (2020.02); *G05D 1/0214* (2013.01); *B60W 2510/18* (2013.01); *B60W 2552/05* (2020.02); *B60W 2552/10* (2020.02); *B60W 2552/20* (2020.02); *B60W 2554/20* (2020.02); *B60W 2554/402* (2020.02);

(Continued)

(58) Field of Classification Search
None
See application file for complete search history.

(56) References Cited

U.S. PATENT DOCUMENTS 9,278,689 B1    3/2016  Delp
9,751,463 B1    9/2017  Ramcharitar et al.
(Continued)

FOREIGN PATENT DOCUMENTS

DE    102015014789 A1    5/2016
JP    2006184213 A       7/2006
WO    2019026579 A1      2/2019

OTHER PUBLICATIONS

Machine Translation of JP2006184213A, 2006, Espacenet (Year: 2006).
Machine Translation of WO 2019026579 A 1 (Year: 2019).

*Primary Examiner* — Hussein Elchanti
*Assistant Examiner* — Kenneth M Dunne
(74) *Attorney, Agent, or Firm* — Botos Churchill IP Law

(57) ABSTRACT

Sensor data identifying an emergency vehicle approaching the autonomous vehicle may be received. A predicted trajectory for the emergency vehicle may be received. Whether the autonomous vehicle is impeding the emergency vehicle may be determined based on the predicted trajectory and map information identifying a road on which the autonomous vehicle is currently traveling. Based on a determination that the autonomous vehicle is impeding the emergency vehicle, the autonomous vehicle may be controlled in an autonomous driving mode in order to respond to the emergency vehicle.

16 Claims, 14 Drawing Sheets

(52) U.S. Cl.
CPC .............. *B60W 2554/4041* (2020.02); *B60W 2554/4042* (2020.02); *B60W 2554/4045* (2020.02)

(56) References Cited

U.S. PATENT DOCUMENTS

| | | |
|---|---|---|
| 9,869,560 B2 | 1/2018 | Gordon et al. |
| 10,852,736 B2 | 12/2020 | Tao et al. |
| 10,896,606 B1 | 1/2021 | Hayes et al. |
| 10,988,110 B1 | 4/2021 | Patnaik |
| 2016/0252905 A1 | 9/2016 | Tian et al. |
| 2017/0192429 A1 | 7/2017 | Tseng et al. |
| 2018/0012492 A1 | 1/2018 | Baldwin et al. |
| 2018/0208188 A1 | 7/2018 | Williams et al. |
| 2018/0233040 A1 | 8/2018 | Zydek et al. |
| 2018/0233047 A1 | 8/2018 | Mandeville-Clarke |
| 2018/0334161 A1 | 11/2018 | Mizuno et al. |
| 2018/0354527 A1 | 12/2018 | Fukunaga |
| 2019/0035269 A1 | 1/2019 | Donovan et al. |
| 2019/0039613 A1 | 2/2019 | Lee et al. |
| 2020/0094826 A1 | 3/2020 | Abe et al. |
| 2020/0159234 A1 | 5/2020 | Ohara et al. |
| 2020/0238981 A1 | 7/2020 | Seo |
| 2020/0307634 A1 | 10/2020 | Yashiro |
| 2021/0009117 A1* | 1/2021 | Emura .................. B60Q 5/006 |
| 2021/0016801 A1 | 1/2021 | Nakagawa et al. |
| 2021/0107476 A1 | 4/2021 | Cui |
| 2021/0201676 A1 | 7/2021 | Tariq et al. |
| 2021/0253128 A1 | 8/2021 | Nister et al. |
| 2022/0157165 A1* | 5/2022 | Dantrey ................. G06N 3/047 |

* cited by examiner

RESPONDING TO EMERGENCY VEHICLES FOR AUTONOMOUS VEHICLES

CROSS REFERENCE TO RELATED APPLICATIONS

The present application is a continuation of U.S. patent application Ser. No. 17/359,861, filed Jun. 28, 2021, the entire disclosure of which is incorporated herein by reference.

BACKGROUND

Autonomous vehicles, for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Thus, such vehicles may be largely dependent on systems that are capable of determining the location of the autonomous vehicle at any given time, as well as detecting and identifying objects external to the autonomous vehicle, such as other vehicles, stop lights, pedestrians, etc.

BRIEF SUMMARY

Aspects of the disclosure provide a method of enabling autonomous vehicles to respond to emergency vehicles. The method includes receiving, by one or more processors, sensor data identifying an emergency vehicle approaching an autonomous vehicle; receiving, by the one or more processors, a predicted trajectory for the emergency vehicle; determining, by the one or more processors, whether the autonomous vehicle is impeding the emergency vehicle based on the predicted trajectory and map information identifying a road on which the autonomous vehicle is currently traveling; and based on a determination that the autonomous vehicle is impeding the emergency vehicle, controlling, by the one or more processors, the autonomous vehicle in an autonomous driving mode in order to respond to the emergency vehicle.

In one example, determining whether the autonomous vehicle is impeding the emergency vehicle is further based on a plurality of heuristics. In another example, determining whether the autonomous vehicle is impeding the emergency vehicle is further based on whether the emergency vehicle is approaching the autonomous vehicle from in front of or behind the autonomous vehicle. In this example, when the emergency vehicle is approaching the autonomous vehicle from in front of the autonomous vehicle, determining whether the autonomous vehicle is impeding the emergency vehicle further includes determining whether the autonomous vehicle is on a road which will allow the emergency vehicle to pass the autonomous vehicle. In addition or alternatively, when the emergency vehicle is approaching the autonomous vehicle from in front of the autonomous vehicle, determining whether the autonomous vehicle is impeding the emergency vehicle further includes determining whether there are multiple lanes of traffic for the road going in a same direction of traffic. In addition or alternatively, when the emergency vehicle is approaching the autonomous vehicle from in front of the autonomous vehicle, determining whether the autonomous vehicle is impeding the emergency vehicle further includes determining whether there are multiple lanes of traffic with a same direction of traffic as a lane of the autonomous vehicle and there is no barrier between the multiple lanes of traffic. In addition or alternatively, when the emergency vehicle is approaching the autonomous vehicle from in front of the autonomous vehicle, determining whether the autonomous vehicle is impeding the emergency vehicle further includes determining whether there is only one lane of traffic for the road going in a direction of the autonomous vehicle, whether there is an opposing lane of traffic, and whether there is sufficient available road width for the emergency vehicle to pass the autonomous vehicle. In this example, available road width for passing is measured from a closest edge of a trajectory of the autonomous vehicle, across an opposing lane of traffic to a road edge. Alternatively, available road width for passing is measured from a closest edge of a trajectory of the autonomous vehicle, across an opposing lane of traffic to a closest point on an object identified as a parked vehicle. Alternatively, available road width for passing is measured from a closest edge of a trajectory of the autonomous vehicle, across an opposing lane of traffic to a closest point on an object identified as a vehicle moving below a predetermined speed. Alternatively, available road width for passing is a smallest available road width for passing within a predetermined distance in front of the autonomous vehicle. In addition or alternatively, determining whether the autonomous vehicle is impeding the emergency vehicle is further based on one or more waypoints of a planned trajectory for the autonomous vehicle. In addition or alternatively, when the emergency vehicle is approaching the autonomous vehicle from behind of the autonomous vehicle, determining whether the autonomous vehicle is impeding the emergency vehicle further includes determining whether the emergency vehicle is able to pass the autonomous vehicle. In this example, determining whether the emergency vehicle is able to pass the autonomous vehicle includes determining whether autonomous vehicle has a left or right neighboring lane with a same direction of traffic as a lane of the autonomous vehicle. In addition, when there is no neighboring lane, determining whether the emergency vehicle is able to pass the autonomous vehicle includes determining whether there is an opposing lane of traffic on the road not separated by a median.

In another example, determining whether the autonomous vehicle is impeding the emergency vehicle further includes comparing the predicted trajectory of the emergency vehicle to a planned trajectory of the autonomous vehicle to determine whether the predicted trajectory and the planned trajectory intersect. In another example, controlling the autonomous vehicle in an autonomous driving mode in order to respond to the emergency vehicle further includes: determining whether there is a path between a current location of the emergency vehicle and a current location of autonomous vehicle without the emergency vehicle changing lanes, and when there is a path between the current location of the emergency vehicle and the current location of autonomous vehicle without the emergency vehicle changing lanes, controlling the autonomous vehicle to change lanes. In another example, controlling the autonomous vehicle in an autonomous driving mode in order to respond to the emergency vehicle further includes determining whether the predicted trajectory of the emergency vehicle has the emergency vehicle entering an intended destination lane of a potential lane change of the autonomous vehicle for responding to the emergency vehicle. In another example, controlling the autonomous vehicle in an autonomous driving mode in order to respond to the emergency vehicle further includes identifying a pull over location that includes sufficient available road width for the emergency vehicle to pass the autonomous vehicle. In this example, identifying the pull over location includes penalizing potential pullover locations that may potentially cause other road users to deviate from their current lane. In addition or alternatively, identifying the pull over location includes penalizing potential pullover locations that may potentially cause other road users to enter an oncoming lane of traffic in order to pass the autonomous vehicle. In another example, controlling the autonomous vehicle in an autonomous driving mode in order to respond to the emergency vehicle further includes allowing the autonomous vehicle to enter an intersection to an extent necessary to allow the emergency vehicle sufficient room to pass the autonomous vehicle. In this example, allowing the autonomous vehicle to enter an intersection to an extent necessary to allow the emergency vehicle sufficient room to pass the autonomous vehicle is based on a maximum allowable braking limit for the autonomous vehicle. In another example, when the emergency vehicle is approaching the autonomous vehicle from behind the autonomous vehicle, the autonomous vehicle is in a right most lane without excessive space to a right road edge of the road, and there is sufficient available lane width to a left of the autonomous vehicle for the emergency vehicle to pass the autonomous vehicle without crossing lane boundaries, controlling the autonomous vehicle further includes controlling the autonomous vehicle in order to pull over. In another example, when the emergency vehicle is approaching the autonomous vehicle from behind, the emergency vehicle has been directly behind the autonomous vehicle for a predetermined period of time, and there is a lane or enough space to one side of the autonomous vehicle for the emergency vehicle to pass the autonomous vehicle without crossing lane boundaries, controlling the autonomous vehicle further includes controlling the autonomous vehicle in order to pull over. In another example, controlling the autonomous vehicle includes identifying a pullover location that does not block the emergency vehicle or other traffic. In this example, identifying the pullover location includes identifying the pullover location along a right road edge of the road where there are more than two lanes of traffic on the road. In addition or alternatively, identifying the pullover location includes identifying the pullover location on a one-lane road that leaves enough room on a left of the autonomous vehicle for the emergency vehicle or other vehicle.

DETAILED DESCRIPTION

Overview

Figure 1:
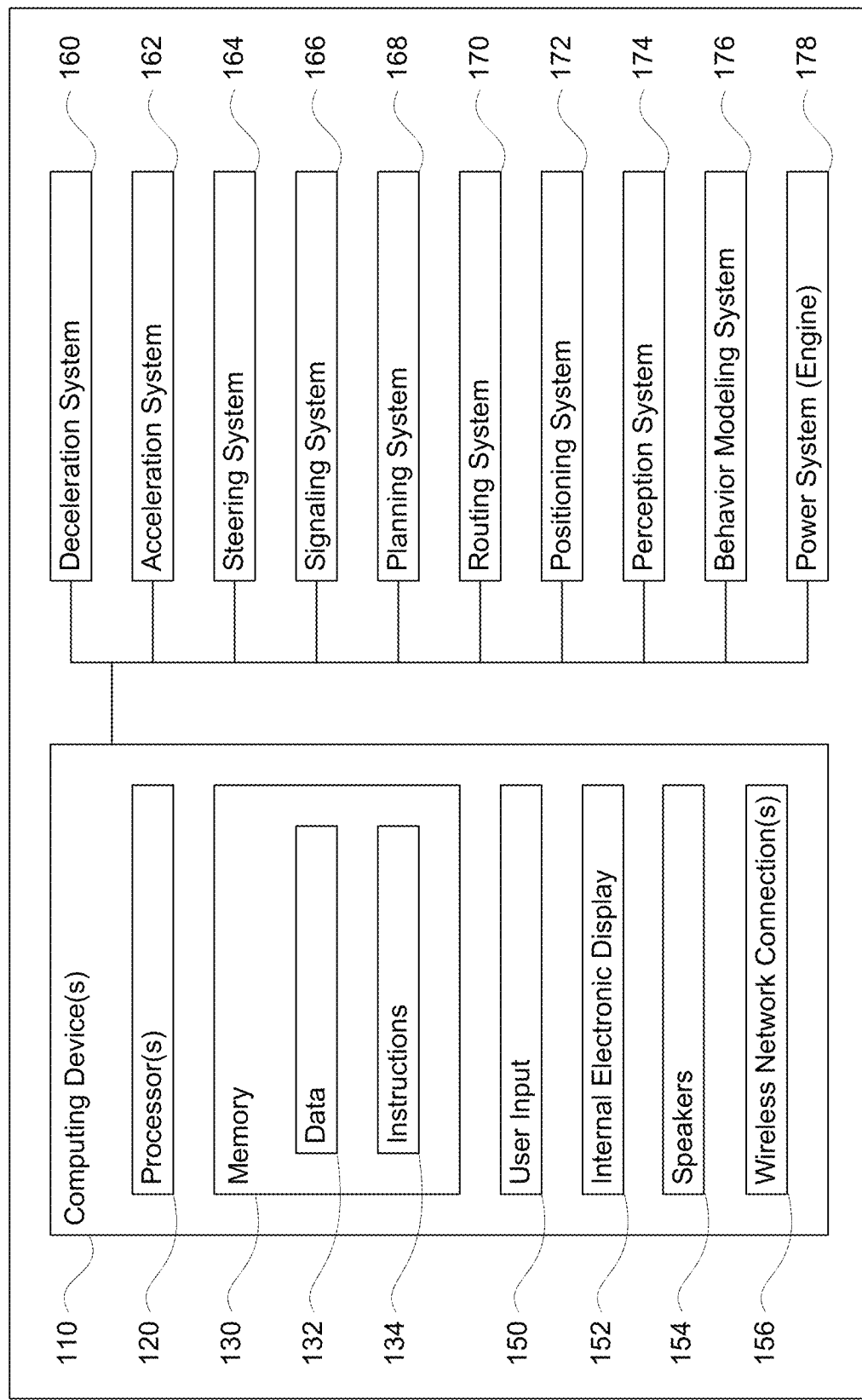
FIG. 1 is a functional diagram of an example vehicle in accordance with an exemplary embodiment.

The technology relates to enabling an autonomous vehicle to detect whether the autonomous vehicle is impeding (e.g. the path or progress of) an emergency vehicle and respond accordingly. Such emergency vehicles may include fire trucks, police vehicles, ambulances, etc. and may be detected by any known approaches using sensor data generated by one or more sensors.

When an autonomous vehicle's perception system detects an object, it may also determine characteristics for that object, such as location, orientation, heading, speed, acceleration, type, etc. For any road user objects, such as vehicles, bicyclists, and pedestrians, this information may be published to other systems of the autonomous vehicle, such as a behavior prediction system. The behavior prediction system may use the characteristics for the detected road user objects to make a prediction about the future characteristics of each of those road user objects including a predicted trajectory for each road user object over time. This information may also be published to other systems of the autonomous vehicle.

One more computing devices of the autonomous vehicle, such as those of the planning system, which generates trajectories in order to follow a route to a destination, may use the information published by the perception system and the behavior prediction system in combination with detailed map information to determine whether the autonomous vehicle is impeding an emergency vehicle. For instance, once an emergency vehicle is detected by the perception system, the one or more computing devices may use a process that involves a plurality of heuristics to determine whether the autonomous vehicle is impeding the emergency vehicle.

The process may involve differentiating between situations when the emergency vehicle is approaching from in front of the autonomous vehicle and when the emergency vehicle is approaching from behind the autonomous vehicle. As such, if the emergency vehicle is not approaching the autonomous vehicle, the autonomous vehicle may be determined to not be impeding the emergency vehicle. If the emergency vehicle is approaching the autonomous vehicle from the front of the autonomous vehicle, the process may involve determining whether the autonomous vehicle is on a narrow road or narrow passage. If not, the autonomous vehicle may be determined to not be impeding the emergency vehicle.

If the emergency vehicle is approaching from behind the autonomous vehicle, the process may include determining whether the emergency vehicle is able to pass the autonomous vehicle. If not, the autonomous vehicle may be determined to be impeding the emergency vehicle.

This process may be repeated for a plurality of waypoints on the autonomous vehicle's planned trajectory to determine whether the autonomous vehicle may be determined to not be impeding the emergency vehicle at different points in time.

Once the autonomous vehicle is determined to be impeding an emergency vehicle, the autonomous vehicle's systems may use this information to determine an appropriate response. Such responses may involve moving out of the way of the emergency vehicle, such as by changing lanes or pulling over. In order to enable such responses, the autonomous vehicle's planning system may prioritize moving out of the way of the emergency vehicle over other road conditions. In some instances, this logic may be implemented using fences. In other instances, the autonomous vehicle may attempt to follow the behavior of other road users when determining a pullover location.

The features described herein may enable an autonomous vehicle to selectively respond to emergency vehicles when the autonomous vehicle is likely to be impeding the emergency vehicle. By doing so, this avoids situations in which the autonomous vehicle's behavior may be potentially detrimental to the emergency vehicle or which might cause the autonomous vehicle to behave in a way that is less predictable for the emergency vehicle, other road users and passengers.

Example Systems

As shown in FIG. 1, an autonomous vehicle 100 in accordance with one aspect of the disclosure includes various components. While certain aspects of the disclosure are particularly useful in connection with specific types of vehicles, the autonomous vehicle may be any type of vehicle including, but not limited to, cars, trucks, motorcycles, buses, recreational vehicles, etc. The autonomous vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the autonomous vehicle 100 and may be capable of communicating with various components of the autonomous vehicle in order to control the autonomous vehicle in an autonomous driving mode. For example, returning to FIG. 1, the computing devices 110 may be in communication with various systems of autonomous vehicle 100, such as deceleration system 160, acceleration system 162, steering system 164, signaling system 166, planning system 168, routing system 170, positioning system 172, perception system 174, behavior prediction system 176, and power system 178 in order to control the movement, speed, etc. of autonomous vehicle 100 in accordance with the instructions 134 of memory 130 in the autonomous driving mode.

As an example, the computing devices 110 may interact with deceleration system 160 and acceleration system 162 in order to control the speed of the autonomous vehicle. Similarly, steering system 164 may be used by computing devices 110 in order to control the direction of autonomous vehicle 100. For example, if autonomous vehicle 100 is configured for use on a road, such as a car or truck, the steering system may include components to control the angle of wheels to turn the autonomous vehicle. The computing devices 110 may also use the signaling system 166 in order to signal the autonomous vehicle's intent to other drivers or vehicles, for example, by lighting turn signals or brake lights when needed.

Routing system 170 may be used by the computing devices 110 in order to generate a route to a destination using map information. Planning system 168 may be used by computing devices 110 in order to generate short-term trajectories that allow the autonomous vehicle to follow routes generated by the routing system. In this regard, the planning system 168 and/or routing system 170 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2:
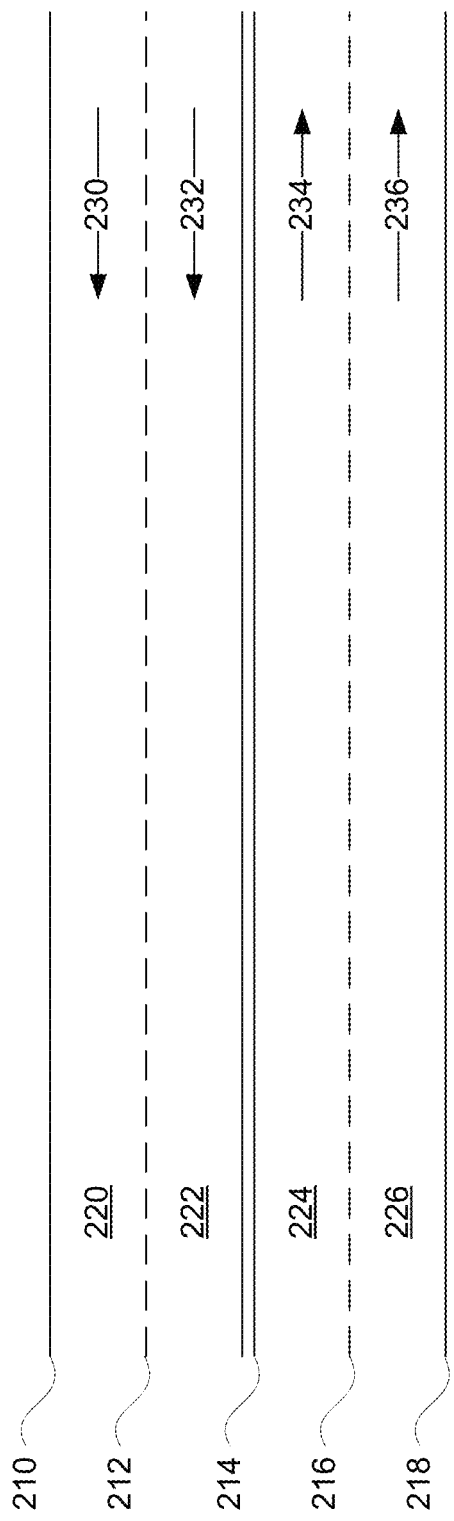
FIG. 2 is an example of map information in accordance with aspects of the disclosure.

FIG. 2 is an example of map information 200 for a small section of roadway. The map information 200 that includes information identifying the shape, location, and other characteristics of lane markers or lane lines 210, 212, 214, 216, 218 which define lanes 220, 222, 224, 226. In this example, lane lines 214 represent double yellow lane lines, lane lines 212, 216 represent dashed white lane lines, and lane lines 210, 218 represent fog lines. Similar depictions in FIGS. 4-13 may represent similar lane line features.

In addition to the aforementioned features and information, the map information may also include information that identifies the direction of traffic for each lane, represented by arrows 230, 232, 234, 236. Here, lanes 220, 222 may be considered neighboring lanes as they are adjacent to one another and have the same direction of traffic. Similarly, lanes 224, 226 may also be considered neighboring lanes as they are adjacent to one another and have the same direction of traffic. In addition, because of the different directions of traffic, lanes 224, 226 may be considered opposing lanes of traffic to lanes 220, 222. Similarly, lanes 220, 222 may be considered opposing lanes of traffic to lanes 224, 226. The map information may also include other information that allows the computing devices 110 to determine whether the autonomous vehicle has the right of way to complete a particular maneuver (i.e. complete a turn or cross a lane of traffic or intersection).

In addition to the aforementioned physical feature information, the map information may be configured as a roadgraph which includes a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic or traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 170 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the autonomous vehicle, etc. Each route may include a list of a plurality of nodes and edges which the autonomous vehicle can use to reach the destination. Routes may be recomputed periodically as the autonomous vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 172 may be used by computing devices 110 in order to determine the autonomous vehicle's relative or absolute position on a map or on the earth. For example, the positioning system 172 may include a GPS receiver to determine the device's latitude, longitude and/or altitude position. Other location systems such as laser-based localization systems, inertial-aided GPS, or camera-based localization may also be used to identify the location of the autonomous vehicle. The location of the autonomous vehicle may include an absolute geographical location, such as latitude, longitude, and altitude, a location of a node or edge of the roadgraph as well as relative location information, such as location relative to other cars immediately around it which can often be determined with less noise at that absolute geographical location.

The positioning system 172 may also include other devices in communication with the computing devices 110, such as an accelerometer, gyroscope or another direction/speed detection device to determine the direction and speed of the autonomous vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 174 also includes one or more components for detecting objects external to the autonomous vehicle such as other vehicles, obstacles in the roadway, traffic signals, signs, trees, etc. For example, the perception system 174 may include LIDARs, sonar, radar, cameras and/or any other detection devices that record data which may be processed by the computing devices 110. In the case where the autonomous vehicle is a passenger vehicle such as a minivan, the minivan may include a laser or other sensors mounted on the roof or other convenient location.

Figure 3:
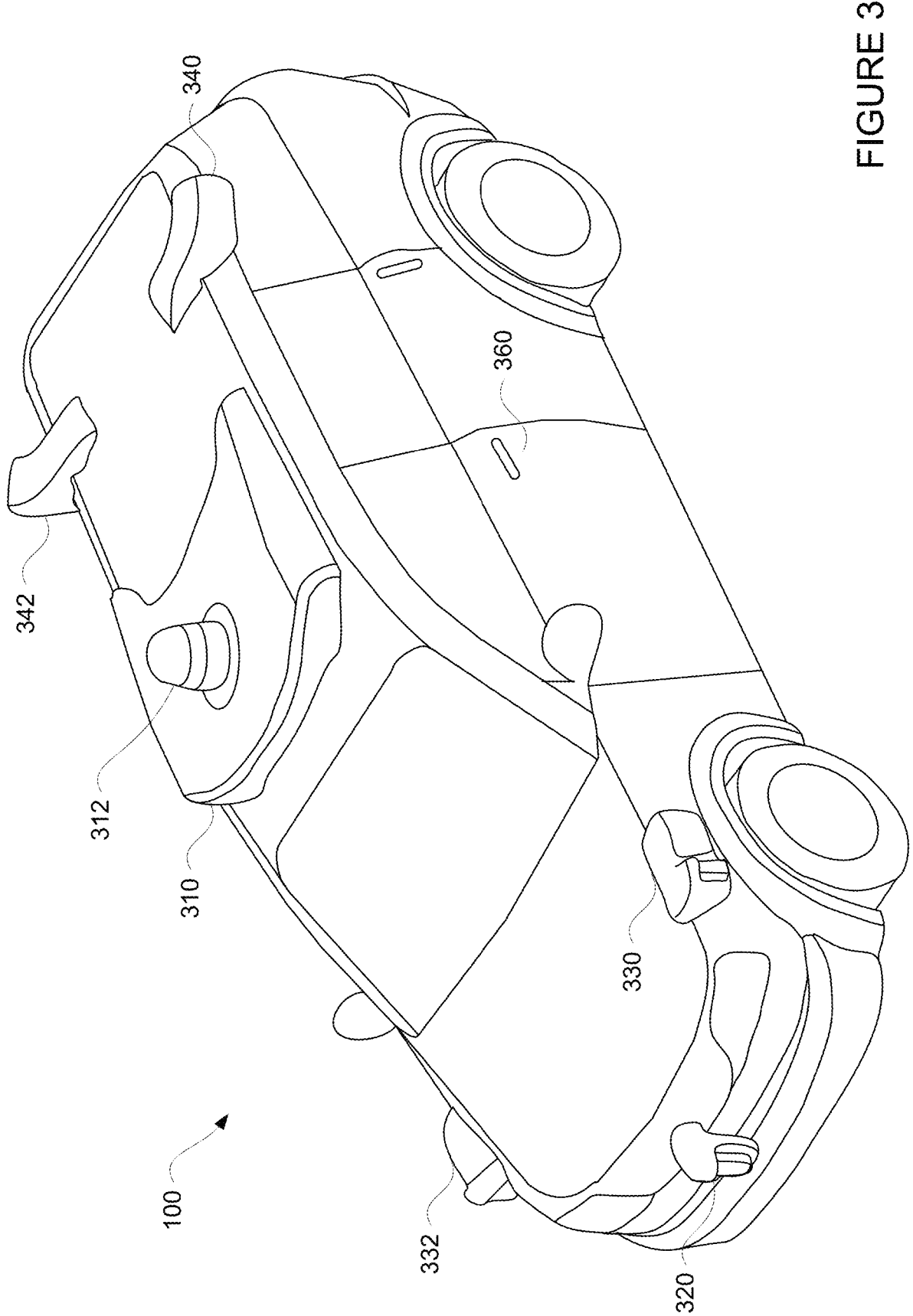
FIG. 3 is an example external view of a vehicle in accordance with aspects of the disclosure.

For instance, FIG. 3 is an example external view of autonomous vehicle 100. In this example, roof-top housing 310 and dome housing 312 may include a LIDAR sensor as well as various cameras and radar units. In addition, housing 320 located at the front end of autonomous vehicle 100 and housings 330, 332 on the driver's and passenger's sides of the autonomous vehicle may each store a LIDAR sensor. For example, housing 330 is located in front of driver door 360. Autonomous vehicle 100 also includes housings 340, 342 for radar units and/or cameras also located on the roof of autonomous vehicle 100. Additional radar units and cameras (not shown) may be located at the front and rear ends of autonomous vehicle 100 and/or on other positions along the roof or roof-top housing 310.

The computing devices 110 may be capable of communicating with various components of the autonomous vehicle in order to control the movement of autonomous vehicle 100 according to the primary vehicle control code of memory of the computing devices 110. For example, returning to FIG. 1, the computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior prediction system 176, and power system 178 (i.e. the autonomous vehicle's engine or motor) in order to control the movement, speed, etc. of autonomous vehicle 100 in accordance with the instructions 134 of memory 130.

The various systems of the autonomous vehicle may function using autonomous vehicle control software in order to determine how to control the autonomous vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior prediction system 176 which uses various behavior prediction models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the autonomous vehicle as well as an emergency vehicle detection system configured to detect emergency vehicles from sensor data generated by sensors of the autonomous vehicle. Each of these detection system software modules may use various models to output a likelihood of a construction zone or an object being an emergency vehicle.

Detected objects, predicted future behaviors, various likelihoods from detection system software modules, the map information identifying the autonomous vehicle's environment, position information from the positioning system 172 identifying the location and orientation of the autonomous vehicle, a destination location or node for the autonomous vehicle as well as feedback from various other systems of the autonomous vehicle may be input into a planning system software module of the planning system 168. The planning system 168 may use this input to generate trajectories for the autonomous vehicle to follow for some brief period of time into the future based on a route generated by a routing module of the routing system 170. In this regard, the trajectories may define the specific characteristics of acceleration, deceleration, speed, etc. to allow the autonomous vehicle to follow the route towards reaching a destination. A control system software module of the computing devices 110 may be configured to control movement of the autonomous vehicle, for instance by controlling braking, acceleration and steering of the autonomous vehicle, in order to follow a trajectory.

The computing devices 110 may control the autonomous vehicle in an autonomous driving mode by controlling various components. For instance, by way of example, the computing devices 110 may navigate the autonomous vehicle to a destination location completely autonomously using data from the detailed map information and planning system 168. The computing devices 110 may use the positioning system 172 to determine the autonomous vehicle's location and perception system 174 to detect and respond to objects when needed to reach the location safely. Again, in order to do so, computing devices 110 and/or planning system 168 may generate trajectories and cause the autonomous vehicle to follow these trajectories, for instance, by causing the autonomous vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the autonomous vehicle and the wheels of the autonomous vehicle. Again, by controlling these systems, computing devices 110 may also control the drivetrain of the autonomous vehicle in order to maneuver the autonomous vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 14:
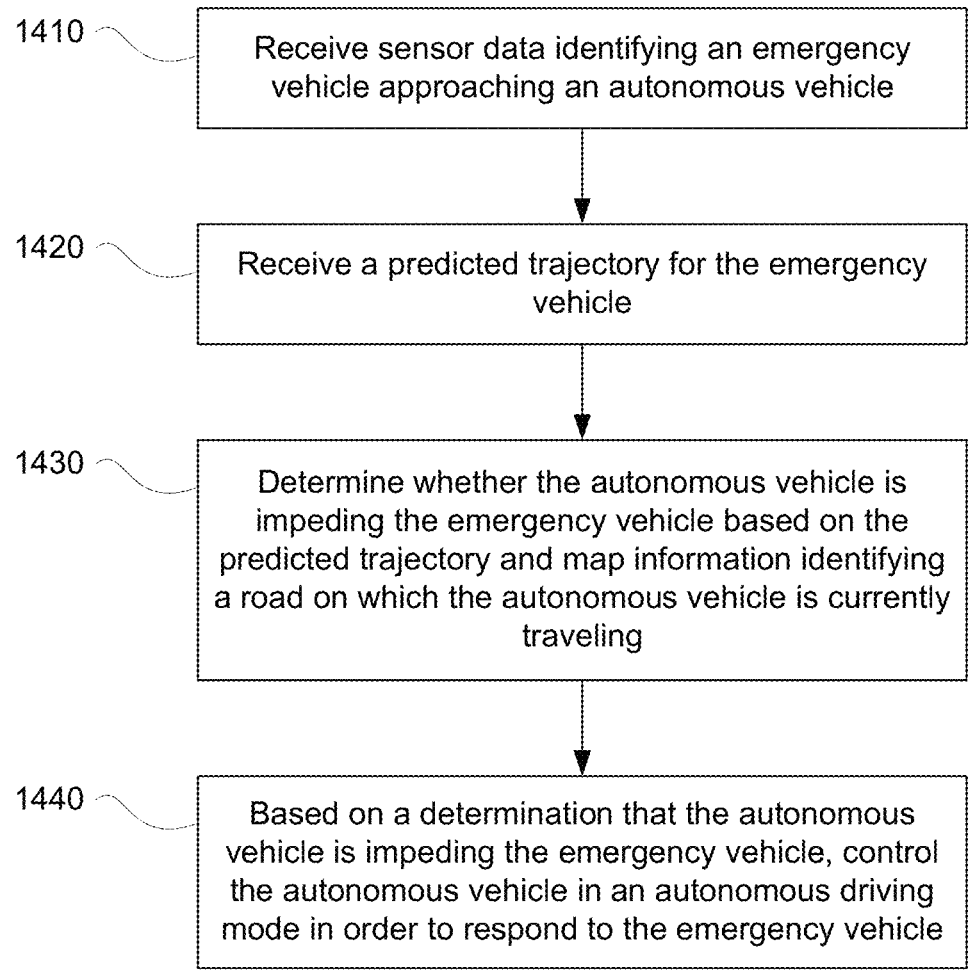
FIG. 14 is an example flow diagram in accordance with aspects of the disclosure.

FIG. 14 is an example flow diagram 1400 for enabling autonomous vehicles to respond to emergency vehicles, which may be performed by one or more processors of one or more computing devices, such as the processors 120 of the computing devices 110 and/or other processors of the various other systems of the autonomous vehicle 100 discussed above. At block 1410, sensor data identifying an emergency vehicle approaching an autonomous vehicle is received. In addition, at block 1420, a predicted trajectory for the emergency vehicle is received.

When autonomous vehicle 100's perception system 174 detects an object, it may also determine characteristics for that object, such as location, orientation, heading, speed, acceleration, type, etc. For any road user objects, such as vehicles, bicyclists, and pedestrians, this information may be published to other systems of the autonomous vehicle, including as noted above the behavior prediction system 176. The behavior prediction system may use the characteristics for the detected road user objects to make a prediction about the future characteristics of each of those road user objects including a predicted trajectory for each road user object over time. This information may also be published to other systems of the autonomous vehicle. In this regard, the computing devices 110 may receive the characteristics for objects, including emergency vehicles, as well as a predicted trajectory for those emergency vehicles.

At block 1430, whether the autonomous vehicle is impeding the emergency vehicle is determined based on the predicted trajectory and map information identifying a road on which the autonomous vehicle is currently traveling. One or more computing devices of the autonomous vehicle, such as the computing devices 110 and/or the planning system 168 may use the information published by the perception system 174 and the behavior prediction system 176 in combination with detailed map information, such as the map information 200, to determine whether the autonomous vehicle is impeding an emergency vehicle. This may occur each time an emergency vehicle is detected or only in certain instances, such as when the emergency vehicle is detected with a siren and/or with flashing lights. Alternatively, this may occur when the presence of an emergency vehicle can be inferred from the circumstances, such as when a siren is detected but cannot be sourced to any particular object, or in situations in which other road users are seen to be pulling over to the left or right of the road on a regular roadway which may suggest that an occluded or out of range (e.g. beyond the range of the sensors of the autonomous vehicle's perception system) emergency vehicle is approaching from behind or in front of the autonomous vehicle. For instance, once an emergency vehicle is detected by the perception system, the one or more computing devices may use a process that involves a plurality of heuristics to determine whether the autonomous vehicle is impeding the emergency vehicle.

The process may involve differentiating between situations when the emergency vehicle is approaching from in front of the autonomous vehicle and when the emergency vehicle is approaching from behind the autonomous vehicle. In either case, the emergency vehicle must be approaching or rather moving towards the autonomous vehicle, either because the emergency vehicle is in an opposing lane of traffic to the lane of the autonomous vehicle or is predicted to cross the route or trajectory of the autonomous vehicle (e.g. at an intersection) for the autonomous vehicle to be determined to be impeding the emergency vehicle. As such, if the emergency vehicle is not approaching the autonomous vehicle, the autonomous vehicle may be determined to not be impeding the emergency vehicle (though it may still be important to track the emergency vehicle for other reasons).

If the emergency vehicle is approaching the autonomous vehicle from the front of the autonomous vehicle (e.g. opposing lanes of traffic, lanes with the same direction of traffic, or cross traffic lanes such as those that intersect at an intersection), the process may first involve determining whether the autonomous vehicle is on road with multiple neighboring lanes going in the same direction of travel. If so, the autonomous vehicle may be determined to not be impeding the emergency vehicle.

The examples of FIGS. 4-13 represent a combination of map information and sensor data identifying an emergency vehicle. In each of these examples, as in the example of FIG. 2 above, the arrows represent the direction of traffic in the different lanes.

Figure 4:
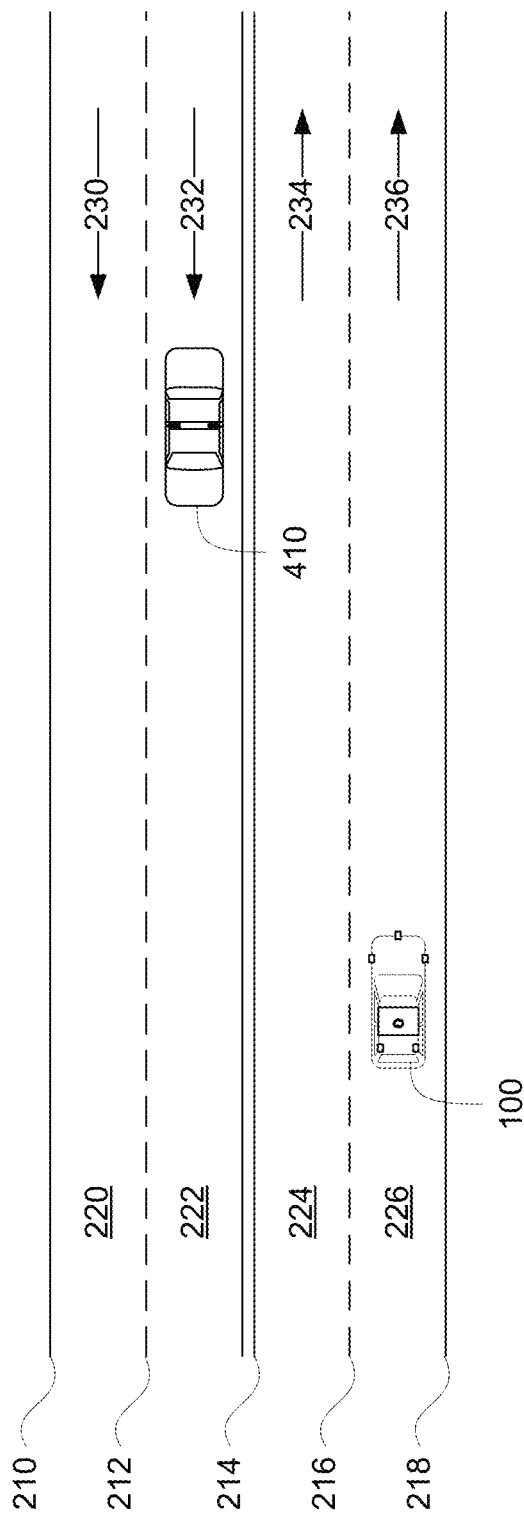
FIGS. 4-13 represent examples of a combination of map information and sensor data identifying emergency vehicles in accordance with aspects of the disclosure.

Turning to the example of FIG. 4, an emergency vehicle 410 is detected by the perception system 174 approaching autonomous vehicle 100 from the front. In this example (which also corresponds to the map information 200), there are more than two lanes of traffic (e.g. there are 4 lanes in the example), and the autonomous vehicle 100 is in the right-most lane of traffic (here lane 226). As such, the autonomous vehicle 100 may be determined by the computing devices 110 to not be impeding the emergency vehicle 410. This may be the same result if the emergency vehicle were in either of lanes 220 or 222.

Figure 5:
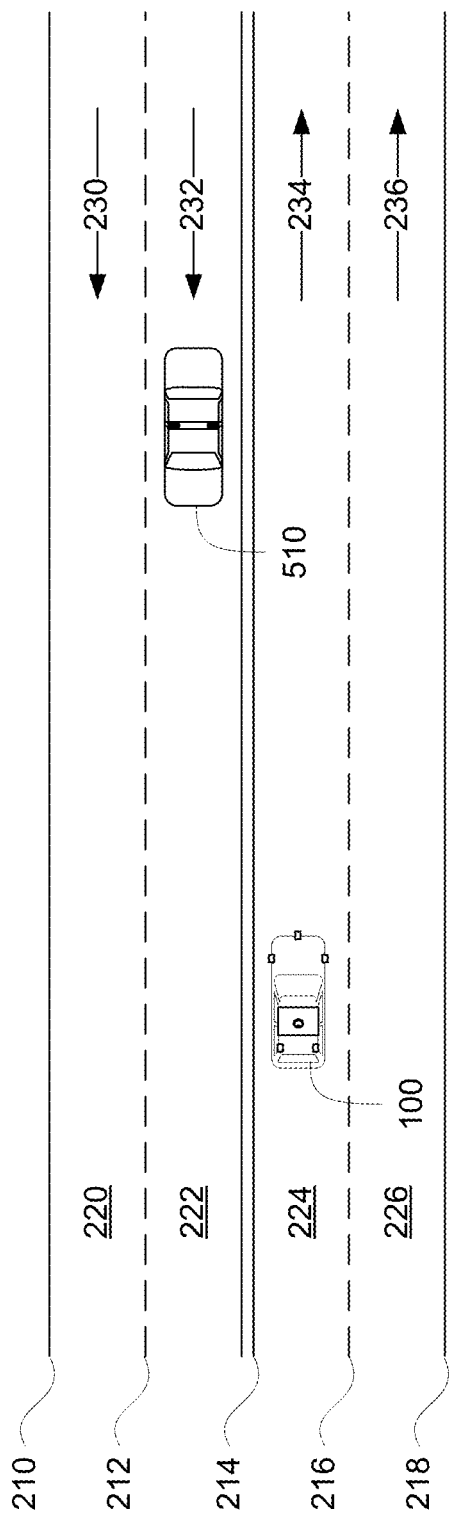

Turning to the example of FIG. 5, an emergency vehicle 510 is detected by the perception system 174 approaching autonomous vehicle 100 from the front. In this example (which also corresponds to the map information 200), there are more than two lanes of traffic (e.g. there are 4 lanes in the example). Unlike in the example of FIG. 4, the autonomous vehicle 100 is not in the right-most lane of traffic (here lane 226). However, because both lanes 220 and 222 have the same direction of travel, the autonomous vehicle 100 may be determined by the computing devices 110 not to be impeding the emergency vehicle 510. This may be the same result if the emergency vehicle were in either of lanes 220 or 222.

Figure 6:
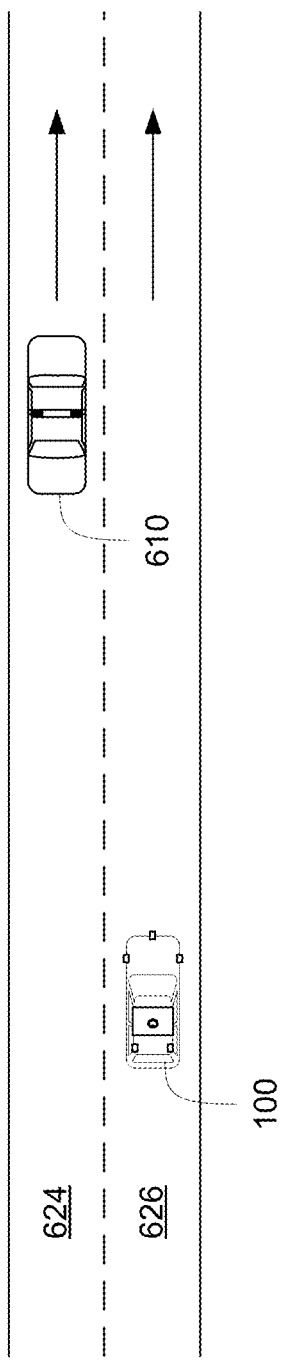

Turning to the example of FIG. 6, an emergency vehicle 610 is detected by the perception system 174 approaching autonomous vehicle 100 from the front. In this example, autonomous vehicle 100 is in lane 626, and the emergency vehicle 610 is in lane 624. Here, both lanes 624 and 626 have the same direction of traffic, and as such, there are multiple lanes of traffic going in the same direction and no opposing lane of traffic. As such, the autonomous vehicle 100 may be determined by the computing devices 110 to not be impeding the emergency vehicle 610.

If the autonomous vehicle is on road without multiple neighboring lanes going in the same direction of travel, the process may involve determining whether there is an opposing lane of traffic to the left of the autonomous vehicle. In other words, the process involves determining whether the autonomous vehicle is on a single lane road. If not, the autonomous vehicle may be determined to not be impeding the emergency vehicle. This avoids the situation in which the emergency vehicle is approaching the autonomous vehicle going in the wrong direction.

Figure 7:
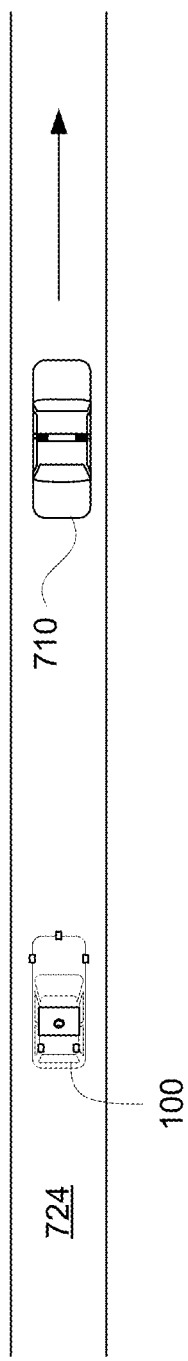

Turning to the example of FIG. 7, an emergency vehicle 710 is detected by the perception system 174 approaching autonomous vehicle 100 from the front. In this example, autonomous vehicle 100 is in lane 724, and emergency vehicle 710 is in lane 724. Lane 724 does not have neighboring lane or opposing lanes of traffic and is thus a single-lane road. As such, the autonomous vehicle 100 may be determined by the computing devices 110 to not be impeding the emergency vehicle 710.

If the autonomous vehicle is on road without multiple neighboring lanes going in the same direction of travel and there is an opposing lane of traffic to the left of the autonomous vehicle, the process may involve determining whether there is a median or other barrier between the autonomous vehicle's lane and the opposing lane of traffic to the left of the autonomous vehicle that would prevent the emergency vehicle from entering into the lane of the autonomous vehicle. If so, the autonomous vehicle may be determined to not be impeding the emergency vehicle.

Figure 8:
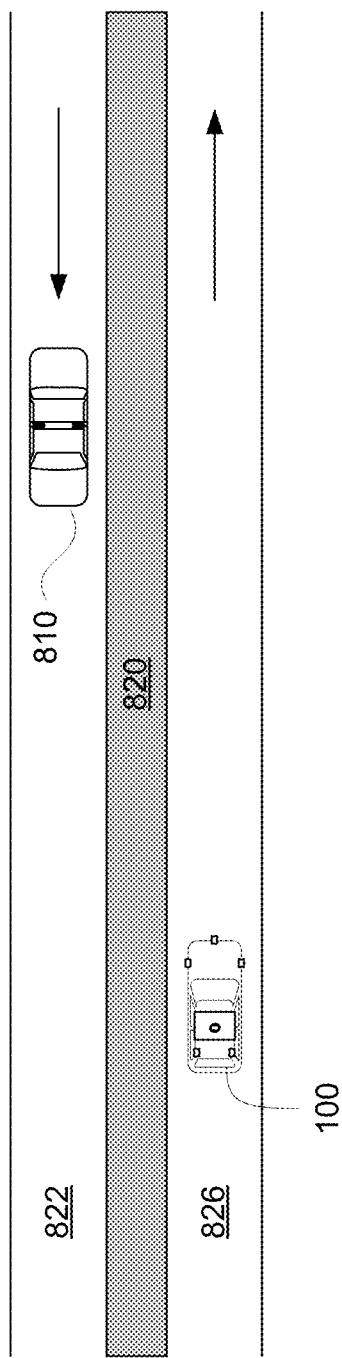

Turning to the example of FIG. 8, an emergency vehicle 810 is detected by the perception system 174 approaching autonomous vehicle 100 from the front. In this example, autonomous vehicle 100 is in lane 826, and emergency vehicle 810 is in lane 822. Here, lanes 822 and 826 have different directions of traffic, so these are opposing lanes of traffic. In addition, as there is a median 820 between the autonomous vehicle 100 and the emergency vehicle 810, so autonomous vehicle 100 may be determined by the computing devices 110 not to be impeding the emergency vehicle 810.

As such, if there is only one lane of traffic going in the direction of the autonomous vehicle and an opposing lane of traffic without a median or other barrier, the process may involve determining whether there is sufficient room or available road width for the emergency vehicle to pass by the autonomous vehicle. A such, if there is insufficient available road width (e.g. because of the general width such as on a narrow bridge, when there are parked vehicles, or when the emergency vehicle is particularly wide) for the emergency vehicle to pass the autonomous vehicle (even if there are no other vehicles in an opposing lane of traffic), the autonomous vehicle may be determined to be impeding the emergency vehicle. This may be determined, for instance, based on the sensor data from the perception system 174 in combination with map information, such as the map information 200. Otherwise, the autonomous vehicle may be determined not to be impeding the emergency vehicle.

The available road width for passing may be determined as the smallest distance available for passing the autonomous vehicle within some distance in front of and/or behind the autonomous vehicle. As an example, the distance may be 5, 10, 15 or more or less meters along the autonomous vehicle's path (i.e. where the autonomous vehicle has already driven) or future planned trajectory (i.e. in front of the autonomous vehicle). In this regard, the available road width for passing may be measured from the closest edge of the autonomous vehicle's trajectory, across the opposing lane of traffic to the road edge and/or to the closest point on an object identified (or classified) as a parked vehicle by the perception system 174. In this regard, if there are slow moving vehicles (e.g. less than or equal to 10 miles per hour or more or less), stationary or parked in the neighboring lane, the emergency vehicle would not be able to pass from that lane. Similarly, if there are fast moving vehicles (e.g. greater than 10 miles per hour or more or less), such vehicles may be ignored or in other words, the autonomous vehicle may assume that fast moving vehicles will themselves move out of the way of the emergency vehicle quickly.

Figure 9:
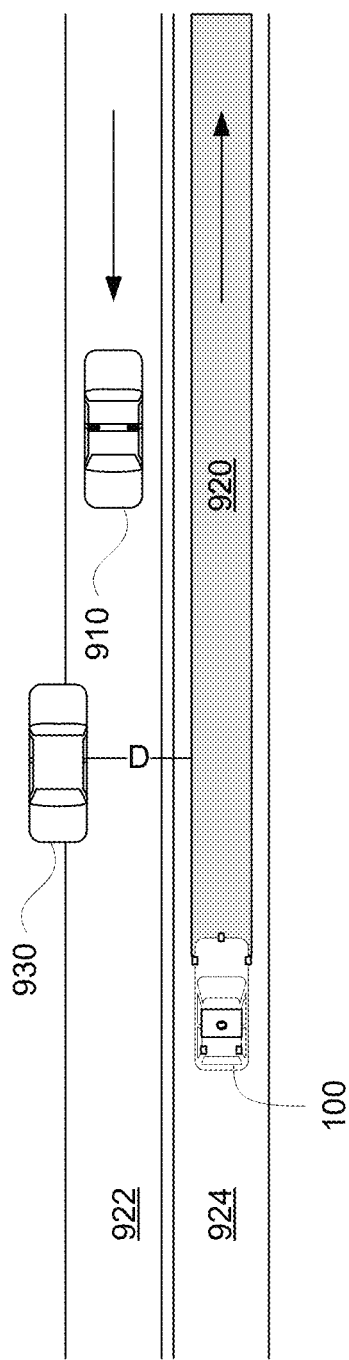

Turning to the example of FIG. 9, an emergency vehicle 910 is detected by the perception system 174 approaching autonomous vehicle 100 from the front. In this example, autonomous vehicle 100 is in lane 924, and emergency vehicle 910 is in lane 922. Here, both lanes 922 and 924 have different directions of traffic, so these are opposing lanes of traffic. Box 920 represents a two-dimensional area or three-dimensional volume of space through which the autonomous vehicle 100 will pass along the current trajectory of box 920. A parked vehicle 930 is also located partially within lane 922. Thus, the distance D may represent an available road width for passing. This distance D may be measured and used to determine whether the available road width is enough to allow the emergency vehicle 910 to pass the autonomous vehicle 100 or rather whether the available road width is greater than the width of the emergency vehicle 910 plus some buffer distance. If so, the autonomous vehicle 100 may be determined by the computing devices 110 not to be impeding the emergency vehicle 910. If not, the autonomous vehicle 100 may be determined by the computing devices 110 to be impeding the emergency vehicle 910.

If the emergency vehicle is approaching from behind the autonomous vehicle, the process may include determining whether the emergency vehicle will need to pass the autonomous vehicle (e.g. come close to the autonomous vehicle as opposed to simply drive in a different direction), is the emergency vehicle able to pass from a neighboring, opposing, or potentially the same lane with available road width for passing. For instance, if the autonomous vehicle is on road with multiple neighboring lanes going in the same direction of travel and there is no median (or other barrier) or slow or stopped vehicle preventing the emergency vehicle from passing the autonomous vehicle in the neighboring lane, the autonomous vehicle may be determined to not be impeding the emergency vehicle. For instance, if the autonomous vehicle has a left or right neighboring lane (e.g. with the same direction of traffic as in the examples above), the emergency vehicle can pass from it (e.g. there is no median or other obstruction), and there is no other stopped or slow-moving vehicles preventing the emergency vehicle from using the neighboring lane, the computing devices 110 may determine that the autonomous vehicle is not be impeding the emergency vehicle.

In such instances, the computing devices may also perform the measurements described above to confirm that there is sufficient available road width for passing. As such, the process may involve determining whether there is sufficient room or available road width for the emergency vehicle to pass by the autonomous vehicle using any available lane of traffic (e.g. neighboring, opposing, same lane, etc.). As such, if there is insufficient available road width (e.g. because of the general width such as on a narrow bridge, when there are parked vehicles, or when the emergency vehicle is particularly wide) for the emergency vehicle to pass the autonomous vehicle (even if there are no other vehicles in an opposing lane of traffic), the autonomous vehicle may be determined to be impeding the emergency vehicle. This may be determined, for instance, based on the sensor data from the perception system 174 in combination with map information, such as the map information 200. Otherwise, the autonomous vehicle may be determined not to be impeding the emergency vehicle. In this regard and as in the example above, the available road width for passing may be measured from the closest edge of the autonomous vehicle's trajectory, across the opposing lane of traffic to the road edge and/or to the closest point on an object identified (and/or classified) as a parked vehicle or slow-moving vehicle by the autonomous vehicle's perception system. If the available road width is too narrow for the width of the emergency vehicle (plus some buffer distance), the emergency vehicle would not be able to pass. In this regard, if there are slow moving vehicles (e.g. less than or equal to 10 miles per hour or more or less), stationary or parked in the neighboring lane, the emergency vehicle would not be able to pass from that lane. Similarly, if there are fast moving vehicles (e.g. greater than 10 miles per hour or more or less), such vehicles may be ignored or in other words, the autonomous vehicle may assume that fast moving vehicles will themselves move out of the way of the emergency vehicle quickly. In addition, in some instances, this may involve ignoring parking lanes (i.e. shoulder areas designated for parking rather than driving).

Figure 10:
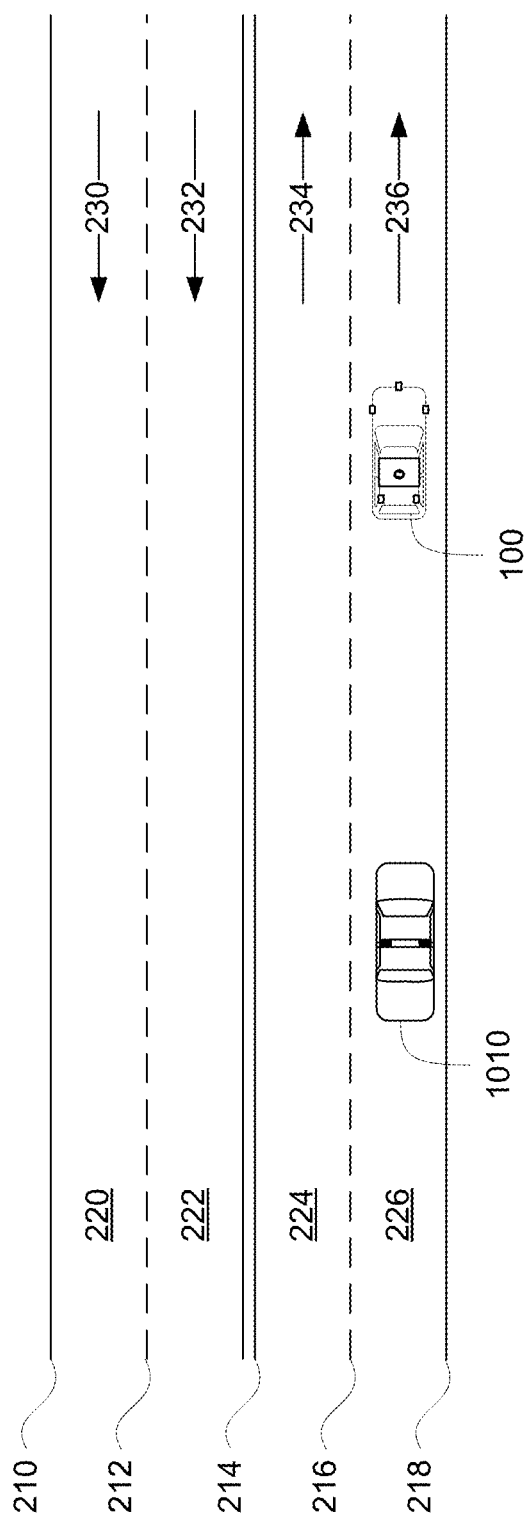

Turning to the example of FIG. 10, an emergency vehicle 1010 is detected by the perception system 174 approaching autonomous vehicle 100 from behind. In this example, autonomous vehicle 100 is in lane 226, and the emergency vehicle 1010 is also in lane 226. Here, both lanes 224 and 226 have the same direction of traffic, so they are neighboring lanes. Moreover, there is no median or other slow-moving vehicles preventing the emergency vehicle from moving between lanes 224 and 226. Again in such instances, the computing devices may also perform the measurements described above to confirm that there is sufficient available road width for passing; however, in this case, there is sufficient available road width for passing considering lane 224. As such, the autonomous vehicle 100 may be determined not to be impeding the emergency vehicle 1010.

Figure 11:
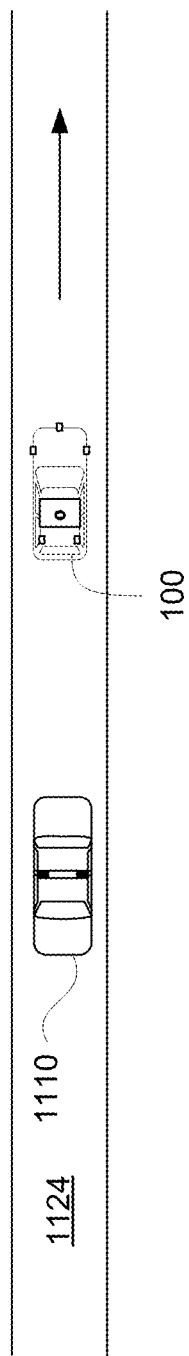

Turning to the example of FIG. 11, an emergency vehicle 1110 is detected by the perception system 174 approaching autonomous vehicle 100 from behind. In this example, autonomous vehicle 100 is in lane 1124, and emergency vehicle 1110 is in lane 1124. Lane 1124 does not have neighboring lane or opposing lanes of traffic and is thus a single-lane road. Again in such instances, the computing devices may also perform the measurements described above to confirm that there is sufficient available road width for passing; however, in this case, there is not sufficient available road width for passing in lane 1124. As such, the autonomous vehicle 100 may be determined by the computing devices 110 to be impeding the emergency vehicle 1110.

Figure 12:
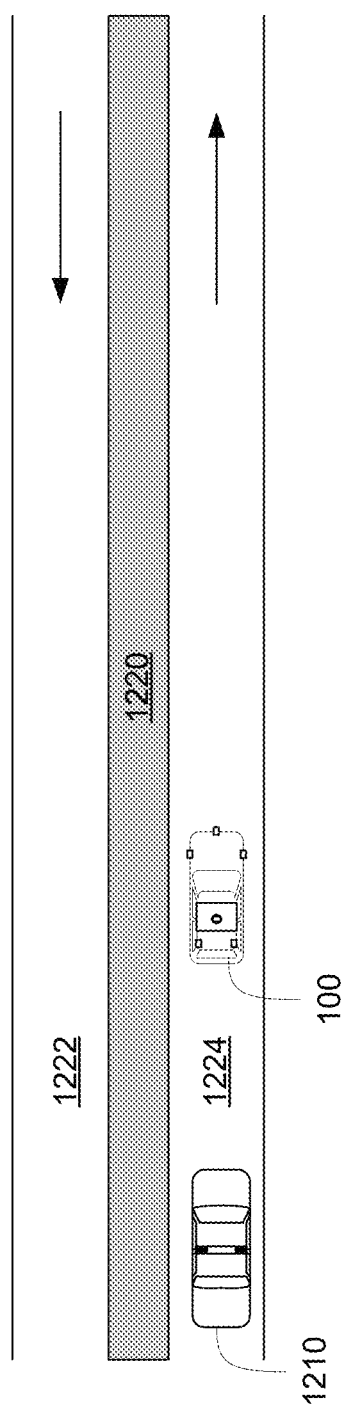

Turning to the example of FIG. 12, an emergency vehicle 1210 is detected by the perception system 174 to be approaching autonomous vehicle 100 from behind. In this example, autonomous vehicle 100 is in lane 1224, and the emergency vehicle 1210 also is in lane 1224. Here, both lanes 1222 and 1224 have different directions of traffic, so these are opposing lanes of traffic. In this example, there is no neighboring lane to lane 1224 and there is also a median 1220 which would prevent the emergency vehicle 1210 from using the lane 1222 to pass the autonomous vehicle. Again in such instances, the computing devices may also perform the measurements described above to confirm that there is sufficient available road width for passing; however, in this case, there is not sufficient available road width for passing considering the width of lane 1222. As such, the autonomous vehicle 100 may be determined by the computing devices 110 to be impeding the emergency vehicle 1210.

Figure 13:
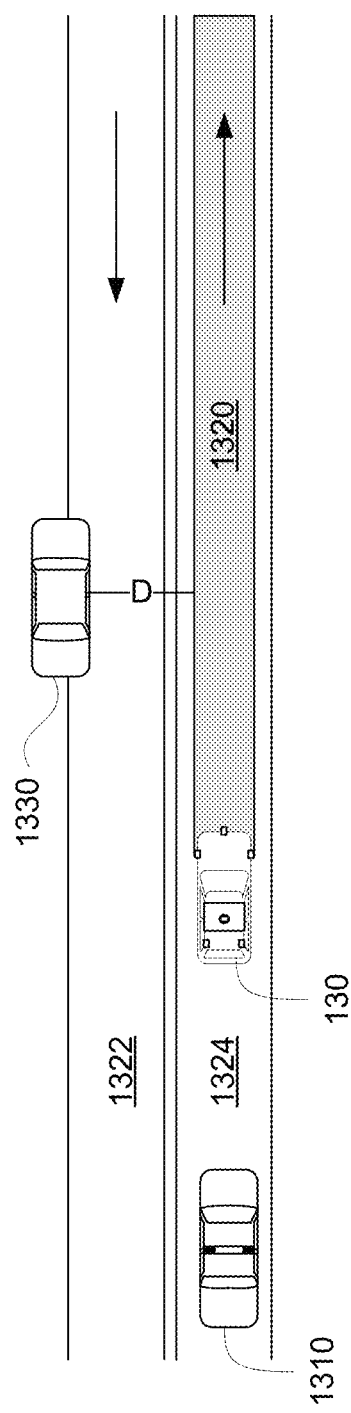

Turning to the example of FIG. 13, an emergency vehicle 1310 is detected by the perception system 174 approaching autonomous vehicle 100 from behind. In this example, autonomous vehicle 100 is in lane 1324, and the emergency vehicle 1310 also is in lane 1324. Here, both lanes 1322 and 1324 have different directions of traffic, so these are opposing lanes of traffic. Box 1320 represents a two-dimensional area or three-dimensional volume of space through which the autonomous vehicle 100 will pass along the current trajectory represented by the box 1320. A parked vehicle 1330 is also located partially within lane 1322. Again in such instances, the computing devices may perform the measurements described above to confirm that there is sufficient available road width for passing. In this example, the distance D may represent an available road width for passing. This distance D may be measured and used to determine whether the available road width is enough to allow the emergency vehicle 1310 to pass the autonomous vehicle 100 or rather whether the available road width is greater than the width of the emergency vehicle 1310 plus some buffer distance. If so, the autonomous vehicle 100 may be determined not to be impeding the emergency vehicle 1310. If not, autonomous vehicle 100 may be determined to be impeding the emergency vehicle 1310.

This process may be repeated for a plurality of waypoints on the autonomous vehicle's planned trajectory to determine whether the autonomous vehicle may be impeding the emergency vehicle at different points (e.g. at the different waypoints along the autonomous vehicle's current trajectory generated by the planning system 168). In this regard, each waypoint may include a location which may correspond to a node in the roadgraph. These waypoints may be sampled every so often along the trajectory, such as every 0.5 meter, every 1 meter, or more or less.

At block 1440 in FIG. 14, based on a determination that the autonomous vehicle is impeding the emergency vehicle, the autonomous vehicle is controlled in an autonomous driving mode in order to respond to the emergency vehicle.

Once the autonomous vehicle 100 is determined to be impeding an emergency vehicle, the computing devices 110 may use this information to determine an appropriate response. Such responses may involve moving out of the way of the emergency vehicle, such as by changing lanes or pulling over. For instance, changing lanes may involve moving one or more lanes to the right or left (assuming the emergency vehicle is not located in such lanes). For example, if there is a direct path between the emergency vehicle's current location and the autonomous vehicle's current location (e.g. to the rear axle of the autonomous vehicle) without the emergency vehicle changing lanes, the autonomous vehicle may automatically perform a lane change to the right. However, in some instances, before a lane change is performed, the computing devices 110 may check whether the emergency vehicle's predicted trajectory has the emergency vehicle entering the intended destination (e.g. the intended destination lane) of the lane change (e.g. intersecting with a waypoint on the planned trajectory that includes the lane change at a specific or any point). If so, the autonomous vehicle may not perform, cancel or abort the lane change and may also take additional actions, such as increasing the cost for lane changes when generating new trajectories.

In other instances, if the autonomous vehicle is not able to move one or more lanes to the right, the autonomous vehicle may attempt to pull over. The autonomous vehicle's computing devices may determine the pullover location using constraints such as ensuring that the pull over location leaves sufficient room or available road width for the emergency vehicle to pass the autonomous vehicle. For instance, when selecting the pullover location the autonomous vehicle's computing devices may penalize (or increase the cost of) some parameters to ensure that the selected pullover location does not impede an emergency vehicle. Examples of such parameters may include a "blocking EV cost" which is calculated based on "corridor width" and "corridor type", which may penalize pullover locations that may potentially cause other road users (such as other vehicles, bicyclists, pedestrians, etc.) to deviate from their current lane and/or enter an opposing lane of traffic in order to pass the autonomous vehicle.

In order to enable such responses, the planning system 168 may prioritize moving out of the way of the emergency vehicle over other road conditions. For example, pulling over for picking up and dropping off passengers may be disabled. In such situations, the autonomous vehicle's current location may be set as the destination for the autonomous vehicle which may effectively cause the autonomous vehicle to pull over as soon as possible. In addition or alternatively, certain restrictions on pulling into intersections (e.g. for a red light or an expected red light) or stopping before stop signs may be ignored, thereby allowing the autonomous vehicle to enter an intersection to the extent necessary to allow the emergency vehicle enough room to pass the autonomous vehicle. For instance, typically, an autonomous vehicle may attempt to pull over and stop for an emergency vehicle before an intersection or rather at an entrance of an intersection (e.g. determined heuristically or from the detailed map information) using the maximum allowable braking limits (e.g. maximum acceptable or allowed deceleration values or limits based on what the autonomous vehicle's brakes are expected to be capable of doing). However, if doing so is not possible but the autonomous vehicle's computing devices have already determined that the autonomous vehicle will stop for the emergency vehicle, the autonomous vehicle may be allowed to enter into an intersection as much as necessary to come to a stop with the maximum allowable braking limits. By connecting this logic to the stopping decision, this avoids the autonomous vehicle going back and forth between a stop and no-stop decision therefore making trajectory planning more consistent.

In some instances, if the autonomous vehicle is initially determined not to be impeding the emergency vehicle, a further check on whether the autonomous vehicle may be impeding the emergency vehicle may be determined based on a comparison of the autonomous vehicle's current trajectory and the location and/or predicted trajectory of the emergency vehicle. For instance, if the emergency vehicle is currently in the same lane as the autonomous vehicle or there is a direct path between the emergency vehicle's current location and the autonomous vehicle's current location (e.g. the rear axle of the autonomous vehicle) without the emergency vehicle changing lanes, the autonomous vehicle may be determined to be impeding the emergency vehicle. As another instance, if the predicted trajectory of the emergency vehicle overlaps with any of the waypoints of the planned trajectory of the autonomous vehicle at a specific (e.g. considering geometry and time) or any (e.g. considering geometry only) point, the autonomous vehicle may be determined to be impeding the emergency vehicle.

In some instances, this logic may be implemented using fences which represent simulated "barriers" that the autonomous vehicle's computing devices will not cross (e.g. the autonomous vehicle will always stop before the location of a fence). For instance, the entrance of an intersection may be associated with a fence when the autonomous vehicle's computing devices have determined that the autonomous vehicle will stop because of a red light or an expected red light. In the example above where the autonomous vehicle is not able to stop before the fence using the maximum allowable braking limits and the autonomous vehicle's computing devices have already determined that the autonomous vehicle will stop for the emergency vehicle, this fence may be moved into the intersection as much as necessary to come to a stop with the maximum allowable braking limits.

In other instances, the autonomous vehicle may attempt to follow the behavior of other road users when determining a pullover location. This may reduce the likelihood of the autonomous vehicle having to perform an action (such as a lane change or stopping) which would impede the progress of the emergency vehicle. For example, If other road users decide to move to the left, the autonomous vehicle will also move to the left rather than the right and this will ensure that the right lane is clear for the emergency vehicle to pass.

In some instances, when the autonomous vehicle is determined to be impeding an emergency vehicle, it may be because the autonomous vehicle is being stopped for a police pullover. To determine whether the autonomous vehicle is being stopped for a police pullover or simply to allow the autonomous vehicle to pull over just in case the autonomous vehicle is being stopped for a police pullover, additional heuristics may be used. These additional heuristics may be employed as an alternative to or in addition to (when the autonomous vehicle is determined to be impeding an emergency vehicle) the above-described heuristics.

For instance, in situations in which the emergency vehicle is approaching the autonomous vehicle from behind, the autonomous vehicle is in a right most lane without excessive space (e.g. 1 meter or more or less) to the right road edge, and there is sufficient available lane width to the left (e.g. the left side or driver's side) of the autonomous vehicle for the emergency vehicle to pass without crossing lane boundaries (such as a double-yellow line), the autonomous vehicle may be controlled in order to pull over. In addition or alternatively, if the emergency vehicle has been directly behind the autonomous vehicle for a predetermined period of time and there is a lane or enough space to the left of the autonomous vehicle for the emergency vehicle to pass in, the autonomous vehicle may be determined as being controlled in order to pull over. In this regard, there may or may not be a specific determination that the emergency vehicle is pulling over the autonomous vehicle. In some instances, these additional heuristics may only be used when the emergency vehicle is classified as a police vehicle.

In such instances where the autonomous vehicle is being controlled in order to pull over, if the emergency vehicle is pulling the autonomous vehicle over by driving behind or stopping in front of the autonomous vehicle, the same responsive behavior can be used. For instance, the autonomous vehicle's computing devices 110 may identify a pull-over location that does not block the emergency vehicle or other traffic. This may involve identifying a pullover location along a right road edge where there are more than two lanes since the emergency vehicle can pass from the left of the two lanes or identifying a pullover location on a one-lane road that leaves enough room on the left of the autonomous vehicle for the emergency vehicle or other vehicles to pass on the left without entering into an opposing lane of traffic.

In addition, when the computing devices of the autonomous vehicle have determined that the autonomous vehicle is impeding an emergency vehicle and/or needs to pull over, the autonomous vehicle's computing devices may display one or more notifications to any passengers of the autonomous vehicle. This may ensure that the autonomous vehicle's responsive behavior (e.g. pulling over, coming to a stop, not stopping to drop off the passenger, or otherwise deviating from a specified route) does not seem surprising or unsafe to the passenger.

The features described herein may enable an autonomous vehicle to selectively respond to emergency vehicles when the autonomous vehicle is likely to be impeding the emergency vehicle. By doing so, this avoids situations in which the autonomous vehicle's behavior may be potentially detrimental to the emergency vehicle or which might cause the autonomous vehicle to behave in a way that is less predictable for the emergency vehicle, other road users and passengers.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   determining, by one or more processors of an autonomous vehicle as an emergency vehicle approaches the autonomous vehicle, whether the autonomous vehicle will impede the emergency vehicle approaching the autonomous vehicle based on an available road width, a width of the emergency vehicle, and a buffer distance, wherein the available road width is a distance from a closest edge of a trajectory of the autonomous vehicle, across an opposing lane of traffic to a closest point on an object identified as a vehicle moving below a predetermined speed; and responsive to determining that the autonomous vehicle will impede the emergency vehicle, controlling, by the one or more processors, the autonomous vehicle in an autonomous driving mode in order to respond to the emergency vehicle.

2. The method of claim 1, wherein determining whether the autonomous vehicle will impede the emergency vehicle comprises determining whether the available road width is greater than the width of the emergency vehicle plus the buffer distance.

3. The method of claim 2, wherein the available road width being less than or equal to the width of the emergency vehicle plus the buffer distance is indicative that the autonomous vehicle will impede the emergency vehicle.

4. The method of claim 2, wherein determining whether the autonomous vehicle will impede the emergency vehicle further comprises, responsive to determining that the available road width is less than or equal to the width of the emergency vehicle plus the buffer distance, determining that the autonomous vehicle will impede the emergency vehicle.

5. The method of claim 1, wherein determining whether the autonomous vehicle will impede the emergency vehicle comprises determining, by the one or more processors, the available road width based on map information identifying a road on which the autonomous vehicle and the emergency vehicle are currently traveling.

6. The method of claim 1, wherein determining whether the autonomous vehicle will impede the emergency vehicle is further based on whether the emergency vehicle is approaching the autonomous vehicle from in front of or behind the autonomous vehicle.

7. The method of claim 1, wherein determining whether the autonomous vehicle will impede the emergency vehicle is further based on a number of lanes of traffic of a road on which the autonomous vehicle and the emergency vehicle are currently traveling.

8. The method of claim 7, wherein determining whether the autonomous vehicle will impede the emergency vehicle is further based on whether the road has only one lane of traffic going in a direction of the autonomous vehicle.

9. The method of claim 7, wherein determining whether the autonomous vehicle will impede the emergency vehicle is further based on whether the road has an opposing lane of traffic.

10. A system comprising:
memory configured to store map information identifying a road on which an autonomous vehicle and an emergency vehicle are currently traveling; and
one or more processors coupled to the memory and configured to:
determine whether the autonomous vehicle will impede the emergency vehicle based on a predicted trajectory of the emergency vehicle approaching the autonomous vehicle and the map information; and
responsive to a determination that the autonomous vehicle will impede the emergency vehicle, control the autonomous vehicle in an autonomous driving mode to cause the autonomous vehicle to enter an intersection to an extent necessary to provide sufficient space for the emergency vehicle to pass the autonomous vehicle.

11. The system of claim 10, wherein the one or more processors are further configured to determine whether the autonomous vehicle will impede the emergency vehicle further based on a plurality of heuristics.

12. The system of claim 10, wherein the one or more processors are further configured to determine whether the autonomous vehicle will impede the emergency vehicle further based on one or more waypoints of a planned trajectory of the autonomous vehicle.

13. The system of claim 10, wherein the one or more processors are configured to:
determine whether the predicted trajectory of the emergency vehicle includes the emergency vehicle entering an intended destination lane of a potential lane change of the autonomous vehicle; and
responsive to a determination that the predicted trajectory of the emergency vehicle includes the emergency vehicle entering the intended destination lane, prevent the potential lane change of the autonomous vehicle.

14. The system of claim 10, wherein the one or more processors are configured to identify a pullover location for the autonomous vehicle such that the autonomous vehicle will not block the emergency vehicle or other traffic on the road.

15. The system of claim 10, wherein the one or more processors are configured to control the autonomous vehicle in the autonomous driving mode to cause the autonomous vehicle to enter the intersection based on a maximum allowable braking limit of the autonomous vehicle.

16. The system of claim 10, wherein the one or more processors are configured to move a virtual fence into the intersection based on a maximum allowable braking limit for the autonomous vehicle to provide sufficient space the emergency vehicle to pass the autonomous vehicle.

* * * * *

UNITED STATES PATENT AND TRADEMARK OFFICE
CERTIFICATE OF CORRECTION

| | |
|---|---|
| PATENT NO. | : 12,252,157 B2 |
| APPLICATION NO. | : 18/497277 |
| DATED | : March 18, 2025 |
| INVENTOR(S) | : Aishwarya Parasuram et al. |

It is certified that error appears in the above-identified patent and that said Letters Patent is hereby corrected as shown below:

In the Claims

Claim 16, Column 20, Lines 49 and 50:
Now reads: "sufficient space the emergency vehicle"; should read -- sufficient space for the emergency vehicle --

Signed and Sealed this
Thirteenth Day of May, 2025

Coke Morgan Stewart
*Acting Director of the United States Patent and Trademark Office*